Aug. 8, 1933.　　　　M. B. MORGAN　　　　1,921,769
DRIVING AXLE
Filed Oct. 9, 1930　　　2 Sheets-Sheet 1

INVENTOR:
Mathew B. Morgan

HIS ATTORNEYS

Aug. 8, 1933.                M. B. MORGAN                1,921,769
                              DRIVING AXLE
                    Filed Oct. 9, 1930          2 Sheets-Sheet 2
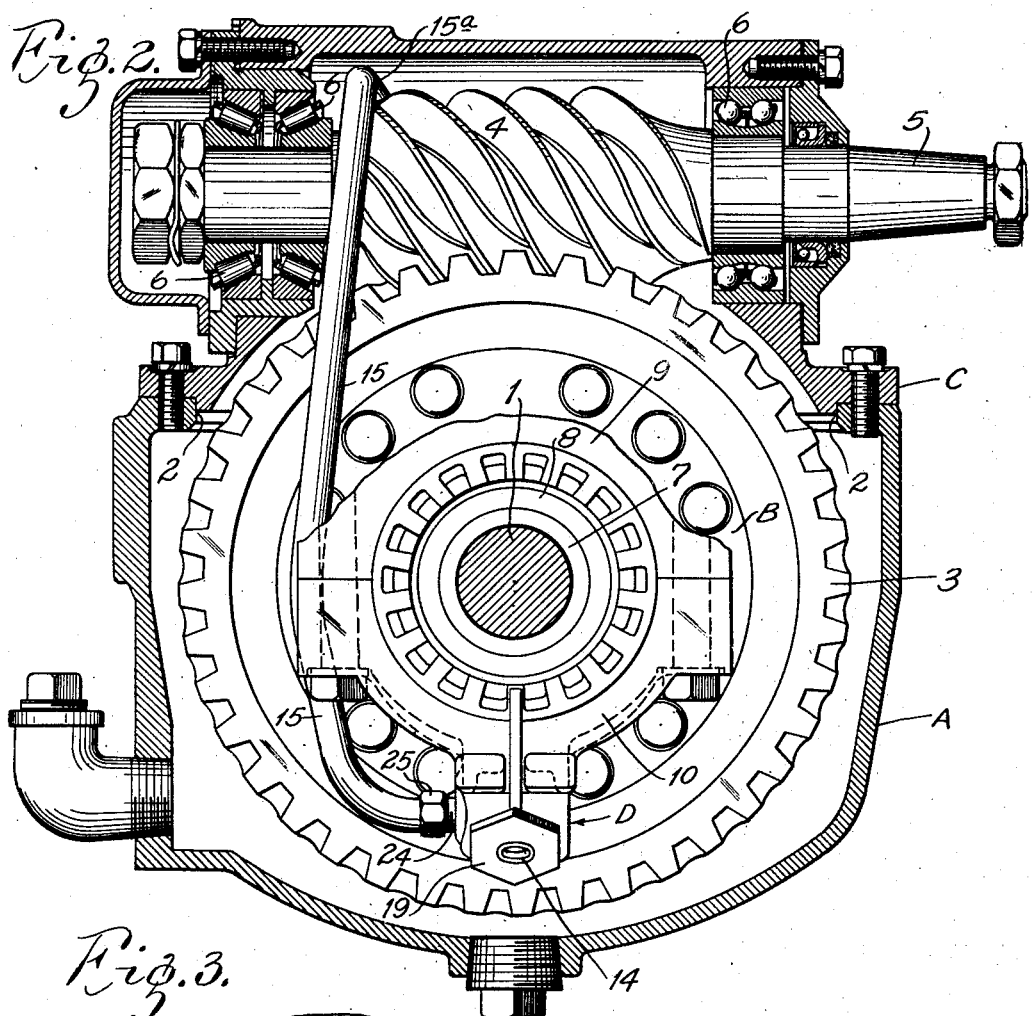
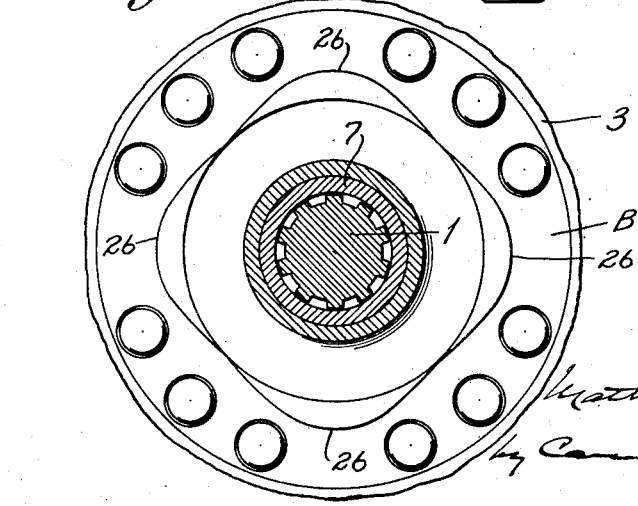
INVENTOR:
Mathew B. Morgan
HIS ATTORNEYS.

Patented Aug. 8, 1933

1,921,769

UNITED STATES PATENT OFFICE

1,921,769

DRIVING AXLE

Mathew B. Morgan, Detroit, Mich., assignor to The Timken-Detroit Axle Company, Detroit, Mich., a Corporation of Ohio Application October 9, 1930. Serial No. 487,441

12 Claims. (Cl. 184—6)

This invention relates to driving axles, particularly automobile driving axles of the worm gear type wherein the worm is located above the worm gear, which runs in lubricant contained in the lower part of the axle housing. The principal object of the present invention is to provide for the adequate lubrication of the contacting surfaces of the worm gear and the overhung worm. Another object is to locate the lubricating means on the carrier for the worm gearing, whereby said means is independent of the axle housing and is removable therefrom with said carrier as a unit. Another object is to provide for the operation of the lubricating means by the rotation of the worm gear. Other objects are simplicity and cheapness of construction and compactness of design.

The invention consists principally in mounting on the gear carrier a pump that is driven by the rotating worm gear and is adapted to pump lubricant from the bottom of the axle housing to the contacting surfaces of said worm gear and the overhung worm. The invention also consists in the arrangements and combinations of parts hereinafter described and claimed.

Figure 1:
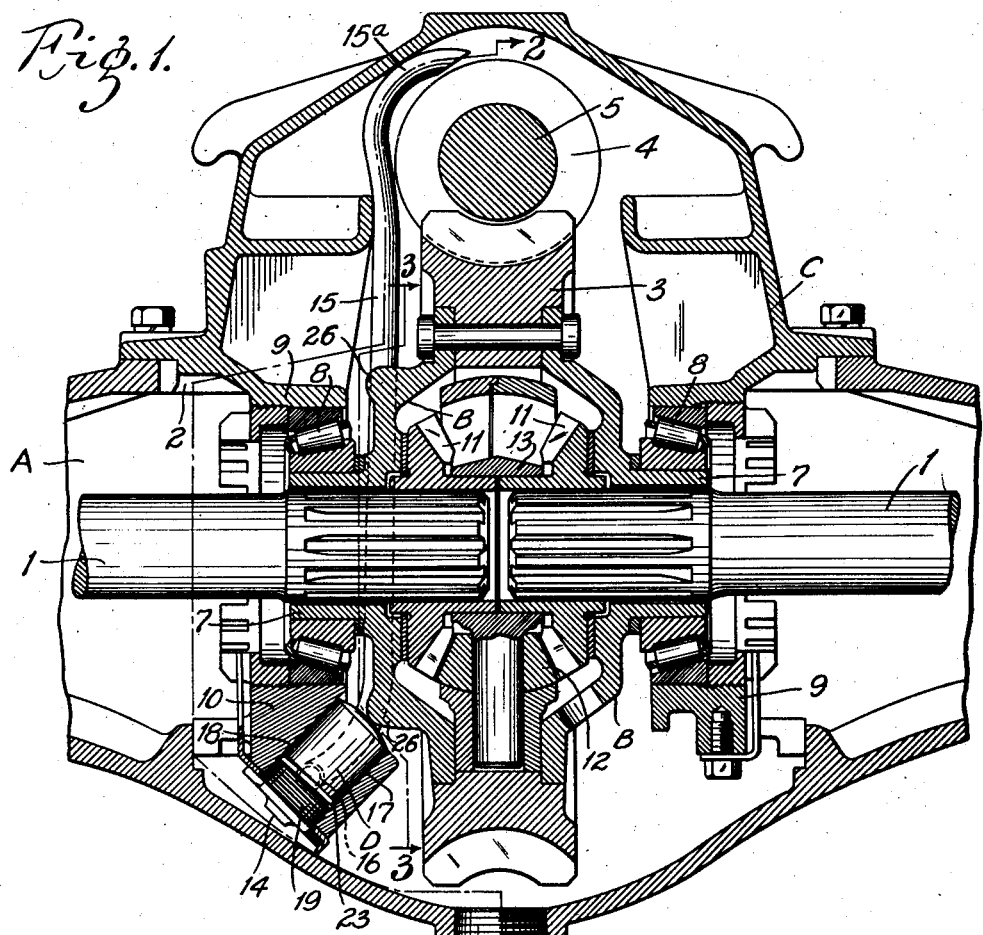
Figure 4:
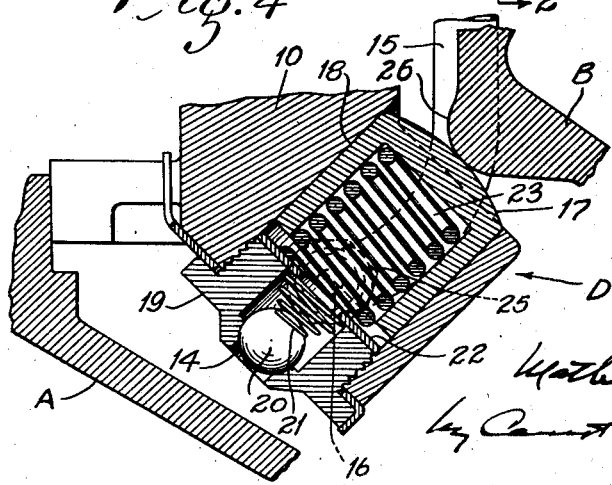

In the accompanying drawings, which form part of this specification and wherein like symbols refer to like parts wherever they occur, Fig. 1 is a vertical central longitudinal section through an automobile driving axle equipped with an oiling device embodying my invention, Fig. 2 is a vertical transverse section through said axle on the line 2—2 of Fig. 1, Fig. 3 is a vertical transverse section on the line 3—3 of Fig. 1; and Fig. 4 is an enlarged longitudinal section through the reciprocating pump and the parts adjacent thereto.

Referring to the accompanying drawings, my invention is shown in connection with a typical worm drive differential driving axle having an overhung worm. Said axle comprises an axle casing or load supporting housing A having axially alined driving shaft sections 1 therein that are connected at their inner ends by differential gearing, which is enclosed within a drum or casing B journaled in a differential gear carrier C for application to said axle housing as a unit. In the construction shown, the axle housing A has an opening 2 at its top to receive the differential gear case B, and the gear carrier C is removably secured to the top of said housing and covers said opening.

Mounted on the differential case B is a worm gear ring 3, which meshes with a worm 4 located above said worm gear on a propeller shaft 5 journaled in suitable antifriction bearings 6 provided therefor in the differential gear carrier C. The differential gear case B has hubs 7 projecting from its ends that are journaled in suitable antifriction bearings 8 mounted on hangers or pedestals 9 which extend downwardly from the gear carrier C into the axle housing A through the opening 2 in the top thereof. For purposes of assembly, one of the depending pedestals 9 of the gear carrier C is split horizontally to provide removable bearing cap 10. The differential mechanism comprises two opposed bevel side gears 11 that are located in differential gear case B and are splined on the inner ends of the respective driving shaft sections 1. Interposed between and intermeshing with the opposed bevel side gears 11 are bevel pinions 12 that are journaled on the radially extending studs of a spider 13 that is arranged to rotate with the differential gear case B.

According to the present invention, the oil in the bottom of the bowl-shaped middle portion of the axle housing A is fed to the contacting surfaces of the worm gear 3 and overhung worm 4 by means of a suitable pump D mounted on the lower portion of the removable pedestal cap 10 of the differential gear carrier C with its inlet port 14 submerged in the oil in the bottom of said axle housing. A pipe 15 leads upwardly from the outlet port 16 at one side of the pump D and has its upper end portion 15a curved downwardly over the worm 4 so as to discharge lubricant upon said worm adjacent its point of meshing with the worm gear 3 located therebelow.

The pump D, which may be of any desired construction, preferably comprises a hollow piston 17 located in a cylindrical bore 18 in the pedestal cap 10 of the gear carrier C and slidable towards and away from the adjacent lower corner of the gear case B. The piston 17 closes the upper end of the bore 18 in which it reciprocates; and the lower end of said bore is closed by means of a screwthreaded cap 19 provided with the inlet port 14, which is normally closed by means of a ball valve 20. This valve is held to its seat by means of a spiral spring 21 located between said ball and a washer 22 interposed between the opposing ends of the cap 19 and the piston 17. The piston 17 is forced in the direction of the gear case B by means of a heavy coil spring 23 interposed between the head of said piston and the washer 22. The outlet port 16 of the reciprocating pump has a nipple 24 threaded therein and the pipe 15, which leads to the worm 4, has its lower end connected to said nipple by means of a nut 25. The head of the piston 17 is located adjacent to the side face of the differential gear case B which has a series of circumferentially spaced cam portions or projections 26 formed integral therewith that are shaped and arranged to bear against the head of the piston and forces it inwardly against the pressure of the spring 21 when said gear case is rotated.

By the arrangement described, the pump D is intermittently operated by the rotary movement of the differential gear case C and thus serves to pump lubricant from the bottom of the axle housing A upwardly through the tube 15 which discharges the lubricant upon the worm 4 adjacent to its point of intermeshment with the worm gear 3. A proper amount of lubricant is thus fed directly to the worm, and any excess lubricant will be flung from the worm and drip back into the bottom of the axle housing. In this way the contacting surfaces of the worm and worm wheel are thoroughly lubricated; whereas heretofore, in automotive practice the only lubricant that reached the worm was the comparatively small amount carried upwardly on the teeth of the worm gear, an amount insufficient for proper lubrication. It is noted as an important advantage of the foregoing construction that the pump D, together with the discharge pipe 15, are mounted in the gear carrier C and are thus removable therewith as a unit from the axle housing A. It is also noted that the mounting of the pump on the pedestal cap 10 of the gear carrier enables said pump to be readily attached to and detached from said carrier. In the construction illustrated in the drawings, the axis of the pump is located in the lower angle between differential gear and the axle shaft section and is inclined with relation to both of them; and by reason of such location and position, it is feasible to utilize a very simple reciprocating pump in the space that would otherwise be void, and the reciprocating pump may be solidly mounted in position with both inlet and outlet ports located advantageously with respect to the oil.

Obviously, the hereinbefore described oiling system admits of considerable modification without departing from the invention, and I do not wish to be limited to the type of driving axle or form of gearing shown.

What I claim is:

1. In an automotive axle construction, the combination with a gear and an overhung driving member intermeshing therewith, of a lubricant containing casing enclosing said gear, a reciprocating pump located in said casing within the projected periphery of said gear with its inlet port in communication therewith below the level of the lubricant therein, a pipe leading from the discharge port of said pump to said overhung driving member, and cam means fixed to and rotatable with the radial side face of said gear for actuating said pump.

2. In an automotive axle construction, the combination with a worm gear and an overhung worm engaging said gear, a housing enclosing said gearing and adapted to contain lubricant in which the lower portion of said worm gear works, a reciprocating pump located in the lower part of said housing within the projected periphery of said gear with its inlet port located below the lubricant level, a pipe located entirely within said housing and leading directly from the discharge port of said pump to said overhung worm, and means rotatable with said worm gear for actuating said pump.

3. The combination with an axle housing, a worm gear therein, an overhung worm in said housing and engaging said gear, said housing being adapted to contain lubricant in which the lower portion of said worm gear works, a reciprocating pump located in said housing within the projected periphery of said gear with its inlet port located below the lubricant level, a pipe located entirely within said housing and leading upwardly along one side face of said worm gear directly from the discharge port of said pump to said overhung worm, and means rotatable with said worm gear for actuating said pump.

4. The combination with an axle housing, a gear carrier supported on and extending into said housing, a worm gear journaled in said carrier, an overhung worm journaled in said carrier and intermeshing with said worm wheel, a pump mounted on said carrier, a pipe leading from the discharge port of said pump to said overhung worm, and means rotatable with said worm gear for operating said pump.

5. The combination with an axle housing, a gear carrier supported on and extending into said housing, a worm gear journaled in said carrier, an overhung worm journaled in said carrier and intermeshing with said worm wheel, a pump mounted on the lower portion of said carrier, a pipe leading from the discharge side of said pump to said overhung worm, and means rotatable with said worm gear for intermittently operating said pump.

6. The combination with an axle housing, of a carrier secured to and extending into said housing, a differential gear unit supported by said carrier and comprising a worm gear and an overhung worm, a pump mounted on said carrier, a pipe leading from said pump to said overhung worm, and means rotatable with said differential gear unit for operating said pump.

7. The combination with an axle housing, of a differential gear carrier secured to and having pedestals extending into said housing, a differential gear unit journaled in said pedestals, said unit comprising a differential gear case, a worm gear thereon and an overhung worm, a pump mounted on one of said pedestals, a pipe leading from said pump to said overhung worm, and means on said differential gear case for actuating said pump.

8. The combination with an axle housing, of a differential gear carrier secured to and having pedestals extending into said housing, a differential gear unit journaled in said pedestals, said unit comprising a differential gear case, a worm gear thereon and an overhung worm, a pump mounted on one of said pedestals, and a pipe leading from the discharge port of said pump to said overhung worm, said differential gear case being provided with a projection adapted to actuate said pump during the rotation of said case.

9. The combination with an axle housing, of a differential gear carrier removably secured to and having pedestals extending into said housing, a differential gear unit journaled in said carrier pedestals, said unit comprising a differential gear case, a worm gear thereon and an overhung worm, a pump mounted on one of said pedestals, and a pipe leading from the discharge port of said pump to said overhung worm, said differential gear case being provided with circumferentially spaced projections adapted during the rotation of said case to intermittently actuate said pump.

10. The combination with an axle housing, of a differential gear carrier secured to and having pedestals extending into said housing, a removable cap for one of said pedestals, a differential gear unit journaled in said carrier pedestals, said unit comprising a differential gear case, a worm gear thereon and an overhung worm, a pump mounted on the removable pedestal cap, a pipe leading upwardly from the discharge port of said pump to said overhung worm, said differential gear case being provided with a projection adapted to actuate said pump during the rotation of said case.

11. A differential gear carrier for automotive driving axles, said carrier having pedestals projecting therefrom, a differential gear unit journaled in said pedestals, said unit comprising a differential gear case, a worm gear thereon and an overhung worm, a pump mounted on one of said pedestals, and a pipe leading from the discharge port of said pump to said overhung worm, said differential gear case being provided with circumferentially spaced projections adapted during the rotation of said case to intermittently actuate said pump.

12. A differential gear carrier for automotive driving axles, said carrier having pedestals projecting therefrom, a removable cap for one of said pedestals, a differential gear unit journaled in said pedestals, said unit comprising a differential gear case, a worm gear thereon and an overhung worm, a pump mounted on said removable pedestal cap, a pipe leading from the discharge port of said pump to said overhung worm, and means on said differential gear case for actuating said pump.

MATHEW B. MORGAN.